United States Patent
Suen et al.

(10) Patent No.: US 7,634,397 B2
(45) Date of Patent: Dec. 15, 2009

(54) SINGLE SERVER INSTANCE, MULTI-LINGUAL APPLICATIONS BASED ON LOOSELY COUPLED METADATA AND PRESENTATION LAYERS

(75) Inventors: Edward Shaw-Lee Suen, San Francisco, CA (US); Sunil Prabhakar Dixit, Redwood City, CA (US); James P. Rogers, Eden Prairie, MN (US); Samar Abbas Lotia, Wayzata, MN (US); Eric Alan Musser, Saint Louis Park, MN (US)

(73) Assignee: Siebel Systems, Inc., San Mateo, CA (US)

( * ) Notice: Subject to any disclaimer, the term of this patent is extended or adjusted under 35 U.S.C. 154(b) by 532 days.

(21) Appl. No.: 10/186,345

(22) Filed: Jun. 27, 2002

(65) Prior Publication Data

US 2007/0225966 A1    Sep. 27, 2007

(51) Int. Cl.
     *G06F 17/20*      (2006.01)
     *G06F 17/28*      (2006.01)

(52) U.S. Cl. ............... 704/8; 704/2; 704/7
(58) Field of Classification Search ............ 707/102; 704/7–8, 2; 709/203, 223
See application file for complete search history.

(56) References Cited

U.S. PATENT DOCUMENTS

| | | | | |
|---|---|---|---|---|
| 5,553,242 A * | 9/1996 | Russell et al. | ............... | 709/227 |
| 5,778,213 A * | 7/1998 | Shakib et al. | ............... | 703/27 |
| 5,903,859 A * | 5/1999 | Stone et al. | ............... | 704/8 |
| 6,006,221 A * | 12/1999 | Liddy et al. | ............... | 707/5 |
| 6,092,037 A * | 7/2000 | Stone et al. | ............... | 704/8 |
| 6,345,243 B1 * | 2/2002 | Clark | ............... | 704/2 |
| 6,349,276 B1 * | 2/2002 | McCarley | ............... | 704/8 |
| 6,360,196 B1 * | 3/2002 | Poznanski et al. | ............... | 704/8 |
| 6,389,385 B1 * | 5/2002 | King | ............... | 703/27 |
| 6,477,569 B1 * | 11/2002 | Sayan et al. | ............... | 709/223 |
| 6,526,426 B1 * | 2/2003 | Lakritz | ............... | 715/536 |
| 6,687,736 B1 * | 2/2004 | Lee | ............... | 709/203 |
| 6,717,588 B1 * | 4/2004 | Miller et al. | ............... | 715/700 |
| 6,754,668 B2 * | 6/2004 | Noble et al. | ............... | 707/102 |
| 6,892,190 B2 * | 5/2005 | Hatori et al. | ............... | 706/12 |
| 6,964,014 B1 * | 11/2005 | Parish | ............... | 715/513 |
| 6,999,916 B2 * | 2/2006 | Lin et al. | ............... | 704/8 |
| 7,099,809 B2 * | 8/2006 | Dori | ............... | 703/6 |
| 7,228,268 B2 * | 6/2007 | Xun | ............... | 704/4 |
| 7,231,342 B2 * | 6/2007 | Edwards et al. | ............... | 704/3 |
| 7,249,012 B2 * | 7/2007 | Moore | ............... | 704/4 |
| 7,571,092 B1 * | 8/2009 | Nieh | ............... | 704/2 |

* cited by examiner

*Primary Examiner*—Richemond Dorvil
*Assistant Examiner*—Eric Yen
(74) *Attorney, Agent, or Firm*—Campbell Stephenson LLP

(57) ABSTRACT

Techniques to provide dynamic multi-lingual support for software applications such as analytics, which typically rely on two different types of data, underlying data and metadata, to generate reports. The metadata defines the underlying data and a presentation layer displays the reports, which may be generated using presentation and metadata layer objects. Each such object may be defined by a language independent representation, which may in turn be associated with multiple display or language dependent representations (i.e., translations or translated strings) for multiple supported languages. One of the languages may be selected for use in a given session, and the display representations for the selected language are then bound to the language independent representations. The binding may be dynamically performed and is session-specific.

19 Claims, 10 Drawing Sheets

Translation Table 450

| | Display Representations (Native Language = English) | Display Representations (Selected Language = German) |
|---|---|---|
| | ⋮ | ⋮ |
| UI Element 1 | "First Name" | "Vorname" |
| UI Element 2 | "Last Name" | "Familienname" |
| UI Element 3 | "Address" | "Adresse" |
| UI Element 4 | "City" | "Stadt" |
| UI Element 5 | "State" | "Bundesstaat" |
| UI Element 6 | "Zip Code" | "Postleitzahl" |
| UI Element 7 | "Telephone" | "Telefon" |
| | ⋮ | ⋮ |
| | 452 | 454 |

FIG. 2A

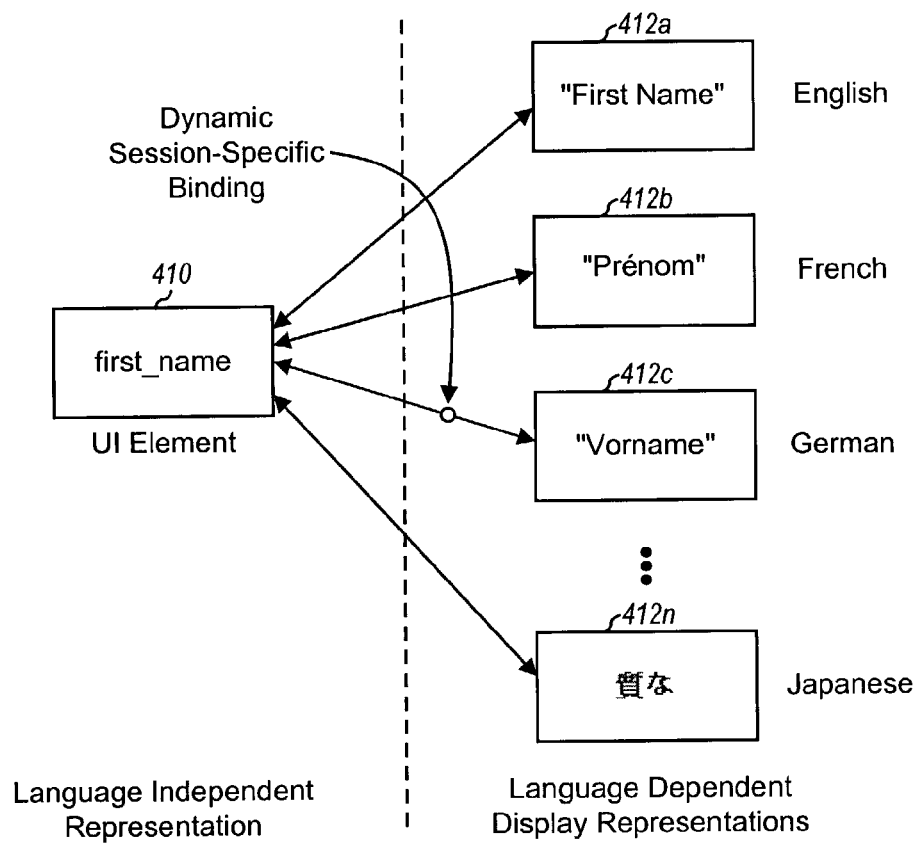

Translation Table 450

| | Display Representations (Native Language = English) | Display Representations (Selected Language = German) |
|---|---|---|
| | ⋮ | ⋮ |
| UI Element 1 | "First Name" | "Vorname" |
| UI Element 2 | "Last Name" | "Familienname" |
| UI Element 3 | "Address" | "Adresse" |
| UI Element 4 | "City" | "Stadt" |
| UI Element 5 | "State" | "Bundesstaat" |
| UI Element 6 | "Zip Code" | "Postleitzahl" |
| UI Element 7 | "Telephone" | "Telefon" |
| | ⋮ | ⋮ |
| | 452 | 454 |

*FIG. 4C*

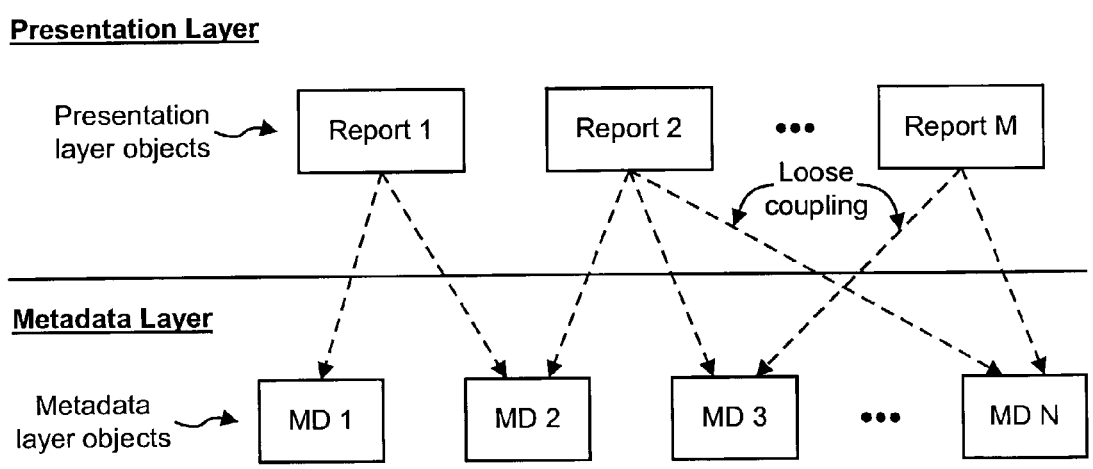

*FIG. 5A*

Mapping Table for Metadata Layer Objects

| Native Language Names | Language | Display Representations |
|---|---|---|
| ⋮ | ⋮ | ⋮ |
| first_name | English | "First Name" |
| first_name | French | "Prénom" |
| first_name | German | "Vorname" |
| ⋮ | ⋮ | ⋮ |
| MD1 | English | |
| MD1 | French | |
| MD1 | German | |
| ⋮ | ⋮ | ⋮ |
| MD2 | English | |
| MD2 | French | |
| MD2 | German | |
| ⋮ | ⋮ | ⋮ |
| 522 | 524 | 526 |

US 7,634,397 B2

SINGLE SERVER INSTANCE, MULTI-LINGUAL APPLICATIONS BASED ON LOOSELY COUPLED METADATA AND PRESENTATION LAYERS

BACKGROUND OF THE INVENTION

The present invention relates generally to computer processing, and more particularly to techniques for providing dynamic multi-lingual support for software applications.

Analytics applications are software tools designed to simplify data analysis for specific business or functional areas, such as sales and marketing management, customer relationship management (CRM), financial management, inventory management, category management, and so on. As the business environment becomes increasingly more complex, a given business or functional area may be inundated with data from a myriad of different sources and of different types. An analytics application then, based on some defined underlying analytics or analysis tools, collects and transforms the data into more meaningful and understandable information. This information may then be provided in a report, which may include one or more graphs, tables, spreadsheets, text, and so on, or any combination thereof. The information in the report may be used to form business decisions and/or adjust business processes.

With the globalization of many businesses and an ever expanding marketplace, analytics applications that can support multiple languages are becoming increasingly important. In particular, an analytics application may need to generate reports in specific languages determined by the background and/or preferences of the end-users.

In one conventional implementation, multiple languages are supported by providing different versions of a software application. A specific software version may then be selected, based on the desired language to be supported, and installed and executed on a computer system. This implementation suffers from three major disadvantages. First, multiple versions of the software application need to be provided. Building analytical applications in different languages becomes a complicated task as the metadata and the reports have to be built for each language. Second, there is no ability to change language after installation, without having to install another version of the application. Third, there is no ability to concurrently support multiple end-users with different language requirements based on a single installation and running instance of the software application (i.e., a single server instance).

As can be seen, techniques that can provide multi-lingual support for software applications (such as analytics) based on a single server instance are highly desirable.

SUMMARY OF THE INVENTION

Techniques to provide dynamic multi-lingual support for software applications such as analytics are described herein. Analytics applications typically rely on two different types of data, often referred to as underlying data and metadata, to generate reports. The underlying data is the raw data, and the metadata is the data that explains or defines the underlying data. A presentation layer provides the reports, which may be constructed using the metadata. The reports may include tables, graphs, texts, and so on, and are made up of objects that are defined by the metadata. The presentation layer comprises display representations that are displayed in the reports for user interface (UI) elements, which are visible, language-dependent objects in the reports.

The metadata layer may be defined using a specific language. Each metadata layer object and presentation layer object may be defined by a language independent representation, which may in turn be associated with multiple display or language dependent representations (i.e., translations or translated strings) for multiple supported languages. This forms a loose coupling between the metadata and presentation layers. One of the supported languages may be selected for use in a given session, and the display representations for the selected language are then bound to the language independent representations. The binding may be dynamically performed, for example, at the start of the session and during the session.

In an embodiment, the binding between the metadata and presentation layers is session-specific. Thus, the binding may be individually and independently performed for different end-users in different sessions. This feature is especially useful for Web-based and server-based applications that can concurrently support multiple end-users who may have different language preferences. Moreover, this feature is useful to allow different end-users with different language preferences to access and analyze the same underlying data.

An embodiment of the invention provides a computer program product operative to provide multi-lingual support and comprising a computer-usable medium having embodied therein computer-readable program codes. The codes initially receive an indication of a first language to be used for a first session and, in response, obtain a set of first display or language dependent representations associated with the first language for a first set of objects s (e.g., those referenced or needed by the first session). Each object is associated with multiple language dependent representations for multiple languages, and the first language dependent representation for each object is selected from among the multiple language dependent representations based on the first language. The codes thereafter use the first language dependent representations for objects included in output reports provided for the first session.

The codes may support a number of sessions, each possibly associated with a different language selection. For each session that uses a language different than the one used to generate reports (i.e., the native language), the codes obtain a set of language dependent representations associated with that language for a set of objects referenced by that session. The codes would thereafter use these language dependent representations for objects included in output reports provided for the session.

The computer program product may operate in conjunction with another application (e.g., an analytics application) that generates input reports in the native language. In that case, the codes for the program product would receive the input reports in the native language and translate the input reports to output reports in a particular selected language. This translation can be achieved by replacing the language independent representations for the native language in the input reports with the corresponding language dependent representations for the selected language to generate the output reports.

The invention further provides other methods, computer program products, and systems capable of implementing various aspects, embodiments, and features of the invention, as described in further detail below.

BRIEF DESCRIPTION OF THE DRAWINGS

FIGS. 2A and 2B show two screens for a report provided in two different languages (English and Japanese) to an end-user in response to a user request;

FIG. 4A is a diagram graphically illustrating the mapping of a language independent representation for an object to multiple display representations;

FIG. 4B is a diagram illustrating an embodiment of a mapping table that may be used to store the mapping between native language names and display representations;

FIG. 4C is a diagram illustrating a UI translation table that may be used to store the display representations for a native language and a selected language;

FIGS. 5A and 5B are diagrams graphically illustrating the relationship between presentation layer objects and metadata layer objects;

FIGS. 5C and 5D are diagrams illustrating a language mapping table for metadata layer objects and a language mapping table for presentation layer objects, respectively;

DESCRIPTION OF THE SPECIFIC EMBODIMENTS

The techniques described herein to provide dynamic multi-lingual support based on a single server instance may be advantageously used for various software applications. For clarity, these techniques are specifically described below for a Web-based analytics application/software/tools. (The software/tools are typically used to build applications.)

As noted above, analytics applications are software tools designed to facilitate and simplify data analysis. As the business environment becomes increasingly more complex, a given business or functional area may be inundated with data from a myriad of different sources and a different types. An analytics application collects, analyzes, and transforms the data into more meaningful and understandable information. This information is typically provided in one or more forms in a report. For example, a report may include graphs, plots, tables, spreadsheets, texts, and so on, or any combination thereof. As used herein, a report is an output provided by a software application in response to a user or machine request, and may include any information/data in any combination of forms/formats.

Analytics applications typically rely on two different types of data, often referred to as underlying data and metadata, to generate reports that include the useful information. The underlying data is the raw data that may be entered by the end-users, data entry clerks, or administrators, or may be generated or provided by various electronics sources. The underlying data may be stored in one or more databases, which are often collectively referred to as a data warehouse. The metadata is the data that explains or defines the underlying data. For example, "XYZ Corp" and "$200,000" may be the underlying data, and "customer name" and "July sales" may be the metadata that respectively explains what "XYZ Corp" and "$200,000" mean. A report for this example may be as simple as a graph of the sales for the last 12 months for "XYZ Corp".

Figure 1:
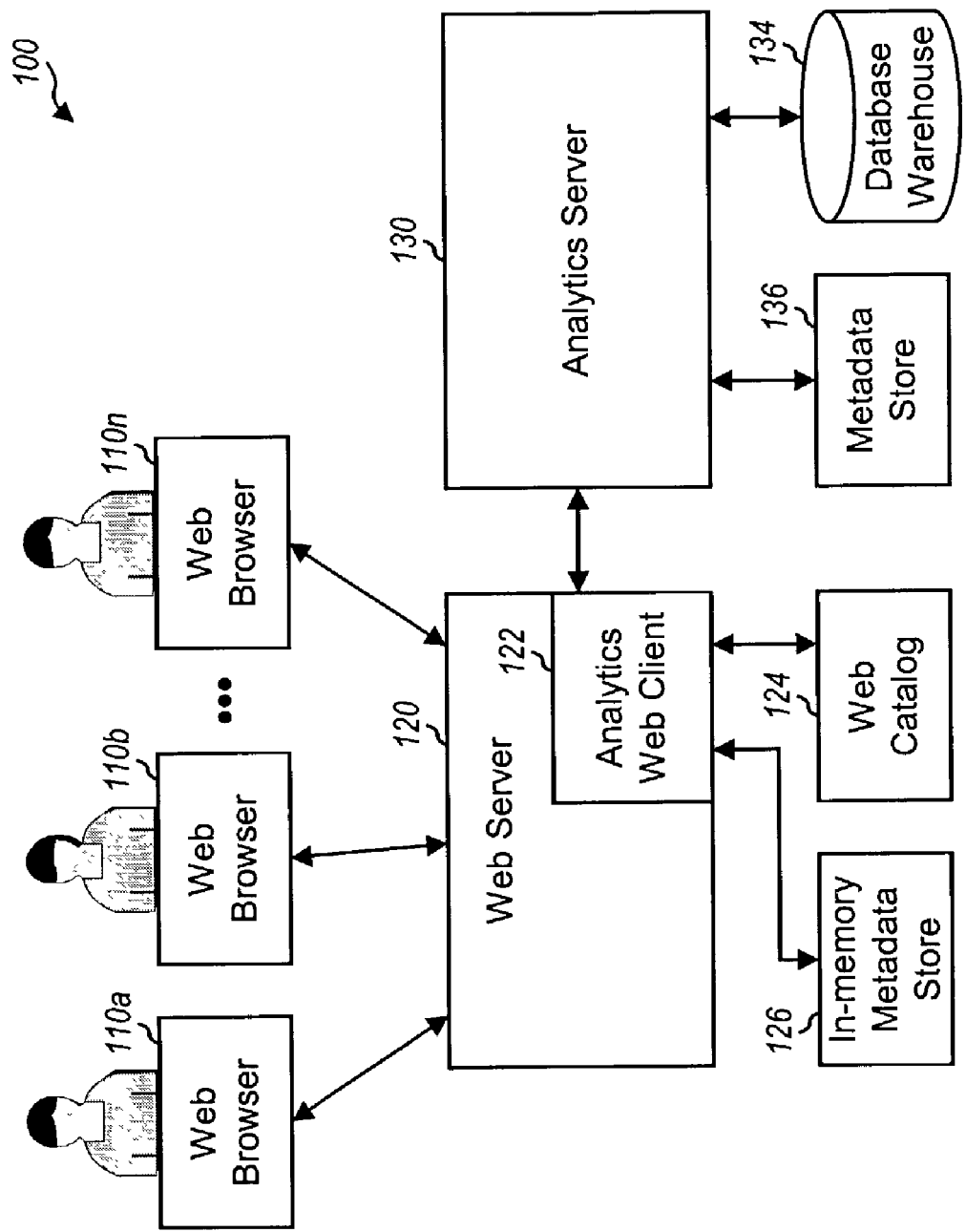
FIG. 1 is a diagram of an embodiment of a computer network wherein various aspects and embodiments of the invention may be implemented.

FIG. 1 is a diagram of an embodiment of a computer network 100 wherein various aspects and embodiments of the invention may be implemented. For this embodiment, computer network 100 is designed to provide analytics functionality for a number of end-users. Computer network 100 comprises a Web server 120 that couples to an analytics server 130.

Web server 120 provides support for a number of end-users, each of whom may access the Web server via a respective Web browser 110. Each Web browser 110 represents a client machine, a terminal, or some other device coupled to the Web server via a communication link. The interconnection between Web browsers 110 and Web server 120 may be a computer network such as the Internet, a wireline connection, a wireless connection, or some other connection. Web server 120 receives requests from the end-users via Web browsers 110, processes each request, and provides the pertinent responses to the Web browsers. Web server 120 may include various software applications that support various functions. For simplicity, only an analytics application is shown in FIG. 1.

Web server 120 includes an analytics Web client 122 that provides support for analytic functionality. For example, a request from a particular Web browser may ask for a particular report. Web server 120 would then instruct analytics Web client 122 to generate the report. If the data needed to generate the report is not already stored in memory, then analytics Web client 122 may request analytics server 130 to provide the needed data. Analytics Web client 122 then receives the data from analytics server 130 and stores it in the memory for future use. Analytics Web client 122 further generates the report using the data and provides the report to Web server 120. Analytics Web client 122 acts as an intermediary between Web server 120 and analytics server 130.

A Web catalog 124 contains various types of data needed by analytics Web client 122 such as data for reports (e.g., report structure, metadata objects used in the report, and so on), graphs (e.g., axis definitions and so on), user-interface (UI) elements (such as links to other reports), tables, and so on. An in-memory metadata store 126 contains some of the metadata that may be needed by Web server 120 and analytics Web client 122. Web catalog 124 and metadata store 126 may be implemented with the separate storage units (or possibly with the same storage unit).

Analytics server 130 performs the main processing to provide analytic functionality for Web server 120. For each request received from analytics Web client 122, analytics server 130 may query a data warehouse 134 for the necessary underlying data. One or more databases may be used to store the underlying data, and these databases are collectively represented as data warehouse 134. A metadata store 136 contains metadata that defines the underlying data stored in data warehouse 134. The units shown in FIG. 1 are described in further detail below.

For clarity, various aspects and embodiments of the invention are described for a Web-based computing environment. In general, the techniques described herein may be used for other computing environments. For example, these techniques may be used for client-server type applications where the user interacts with a Microsoft Windows™-based client program that couples directly to the analytics server, and not necessarily via the Web server.

Figure 2A:
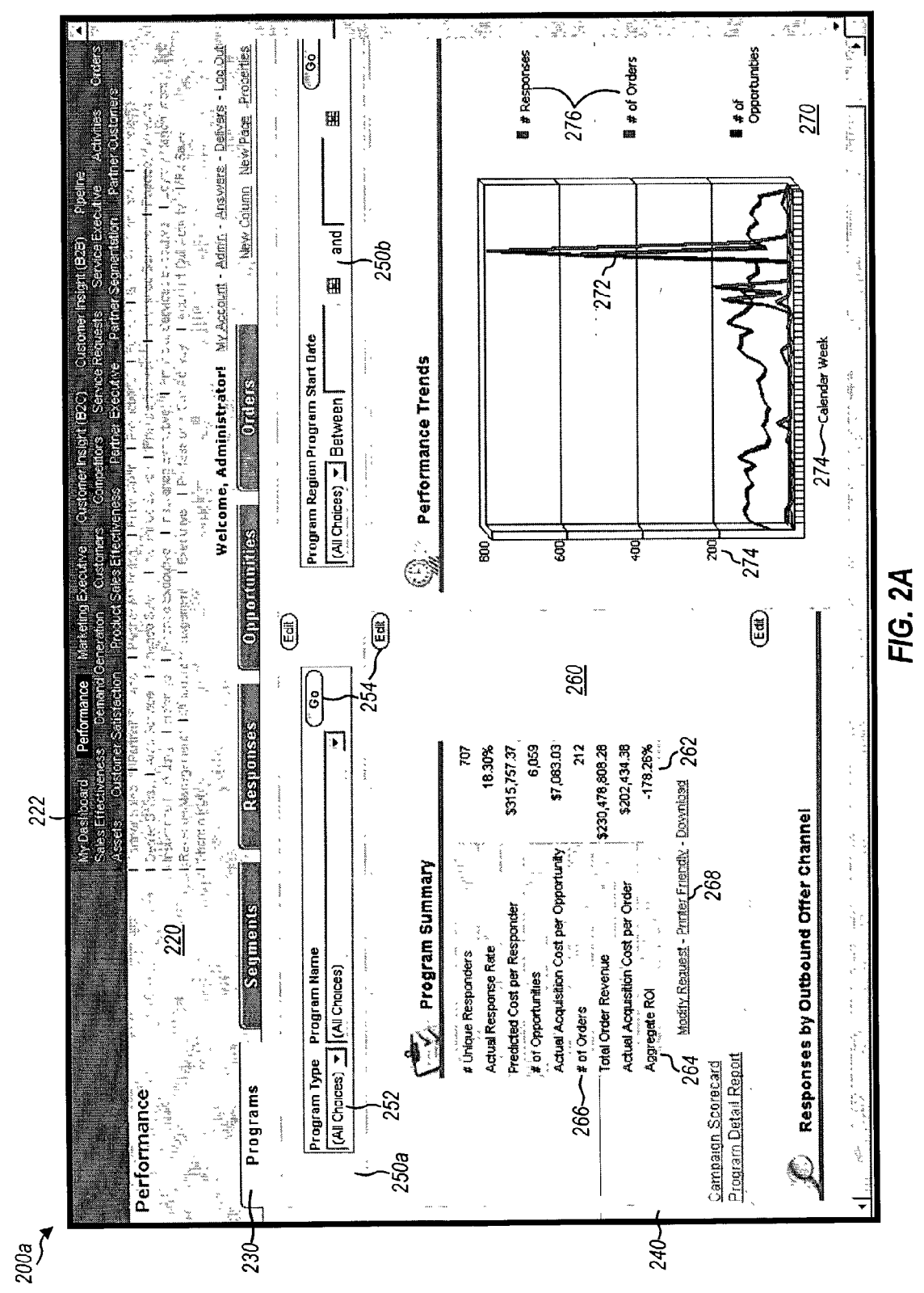

FIG. 2A shows a screen 200a that may be used to provide a report to an end-user in response to a user request. In this embodiment, screen 200a is provided for a Web browser and comprises a display area that is also referred to herein as a "dashboard". The dashboard allows the end-user to view various types of data (or information) in one or more formats. For clarity, the main menu tabs that may be used to invoke various functions of the Web browser are not shown in FIG. 2A.

For the embodiment shown in FIG. 2A, the dashboard includes a menu region 220, a set of tabs 230, and a display area 240. Menu region 220 includes a number of UI elements 222, each of which may be used to invoke a different dashboard. A different set of dashboards may be supported by the analytics application for each business or functional area, and each dashboard may be used to provide data in a particular report format. A different set of UI elements 222 may thus be included in menu region 220 for each business or functional area. In this embodiment, "Performance" is selected by the end-user and highlighted in menu region 220, and the Performance dashboard is displayed in response.

Tabs 230 may be used to allow the end-user to access different sections associated with the report for "Performance". In this example, the "Programs" tab is selected by the end-user to access various information related to programs for the Performance dashboard.

Display area 240 may be designed to display various types of information and menus for the end-user. In the example shown, display area 240 includes four windows 250a, 250b, 260, and 270. Windows 250a and 250b each allow the end-user to enter values for a set of parameters, and a new report may be generated based on the entered parameter values. Windows 250a and 250b may be used to filter the underlying data to be presented in the report. Window 260 displays a summary for the report in tabular form, and window 270 displays graphs for the report.

As used herein, a UI element may be any element on a screen that may be associated with a visual, language-dependent representation. Certain elements on a screen may be provided in forms that are not intended to be dependent on any language, such as company logos, icons, arrows, and so on. Other elements on the screen may be provided using representations that are language dependent, such as texts, links, and so on. For these elements, the proper language-dependent representations (i.e., for the proper language) need to be displayed to allow the end-user to comprehend the information in the report. These visible, language-dependent elements are referred to herein as UI elements. In Web-based applications, the UI elements typically include software controls or hyperlinks that allow the end-user to interact with the software using the keyboard and the mouse. In windows-based applications, the UI elements typically include controls such as, buttons, text titles, drop down boxes, and so on. Both allow interaction with the user through the keyboard and the mouse.

For example, for screen 200a in FIG. 2A, the UI elements may include the links 222 in menu region 220, tabs 230, drop-box elements 252, buttons 254, table elements in column 264, links 268, legends 276, and so on. In general, any visual representation on a screen may be implemented as a UI element, with the exception of (1) the underlying data (such as the data in column 262), and (2) other language independent representations that are not intended to be translated.

Figure 3:
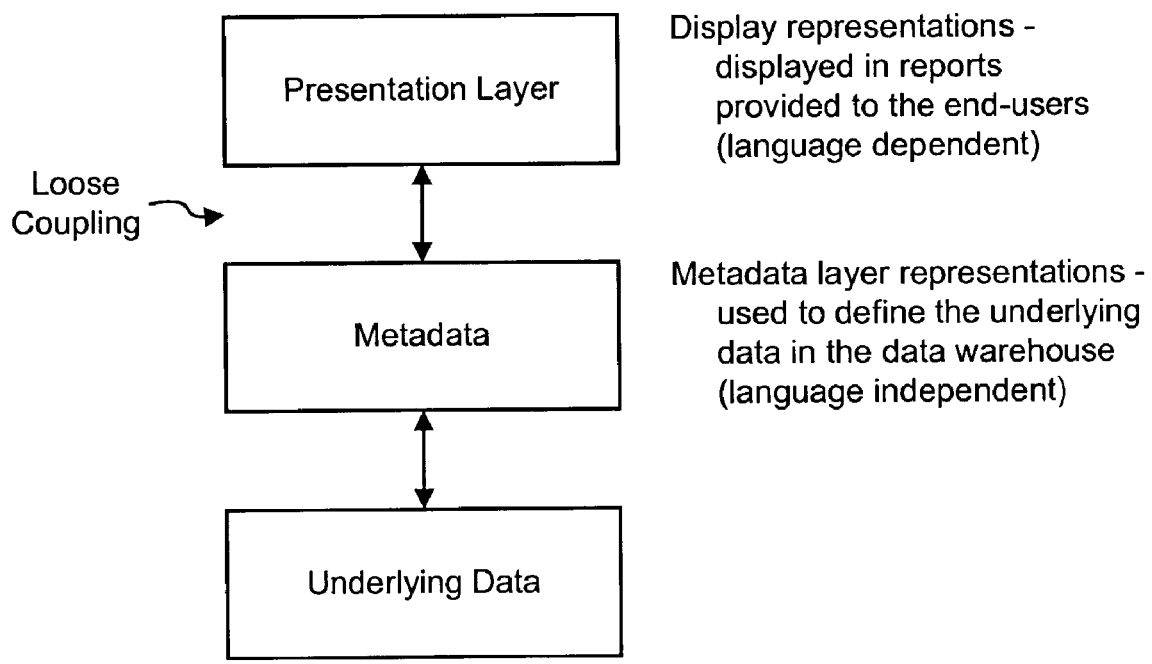
FIG. 3 is a diagram illustrating the different types of data that are used by an analytics application to generate reports.

FIG. 3 is a diagram illustrating the different types of data that are used by an analytics application to generate reports.

As noted above, the underlying data is the raw data used in the reports. For example, referring back to FIG. 2A, the underlying data includes the values in column 262 and the data used to generate plots 272. The underlying data may be entered by the end-users, data entry clerks, administrators, and so on. The underlying data may also be provided by other applications, machines, and/or processes. The underlying data is typically provided in one or more languages, but is often not intended to be translated across languages.

The metadata is the data that explains or defines the underlying data. For example, in FIG. 2A, the metadata includes the text strings in column 264, the x and y axes labels 274, and legend labels 276. The metadata also includes the strings "Program Type" and "Program Name" just above box 252 and used to describe this box. As can be seen from FIG. 2A, the underlying data has no meaning and little value without the associated metadata to explain the underlying data.

A presentation layer typically comprises data used to present or display the underlying data. The presentation layer is thus used to show reports to end-users and to interact with the end-users. For example, the presentation layer may include report definitions, screen layouts, and so on, which may be stored and/or manipulated by a mid-tier application or a client process. The presentation layer is also referred to as a "user-interaction" layer. The presentation layer representation for a UI element is referred to herein as a "display representation".

As shown in FIG. 3, analytical software applications are typically designed based on two separate and distinct layers—the metadata layer and presentation layer. The metadata layer embodies the business logic and also describes or defines the underlying data. The presentation layer is built using the metadata.

Since the metadata typically comprises the data used to define the underlying data, there is a tight coupling between the metadata and the underlying data. Typically, the metadata is itself defined based on a specific language (e.g., English) during the development/construction of the software application. The metadata and the underlying data are typically stored in the data warehouse using this specific language and definition.

Conventionally, the presentation layer is also typically defined based on a specific language (e.g., English), called native language for that instance, which is normally the same language used for the metadata. In this case, there would be a one-to-one correspondence between a presentation layer representation and its associated metadata layer representation. For this conventional design, the presentation layer may be viewed as being tightly coupled to the metadata layer, which is further tightly coupled to the underlying data. For example, since most analytical applications are built using the tight coupling, there is a commitment made to the language of the presentation layer, which is typically dependent on the language used for the metadata.

For example, referring back to FIG. 2A, for entry 266, the underlying data is "212", the metadata representation (which may be a code such as "num_order") indicates that the entry is for "number of orders", and the display representation is "# of Orders". The native language metadata representation is typically intended for internal use and is normally not displayed in reports. For example, business analyst may use the metadata representation to build his/her reports in the presentation layer. As mentioned above, the presentation layer objects such as reports are made up of objects from the metadata layer. The display representation is the visual representation that may be displayed, along with the underlying data, in the reports provided to the end-users.

Conventionally, for a software application designed to support one specific language, there is a strict association between the metadata layer and the presentation layer. In particular, for each UI element, there is a specific metadata representation and an associated display representation. This association may be defined during the development/construction of the application and may even be hard-coded in the software application.

For a Web-based or server-based software application, the same application may be accessed by a multitude of end-users who may be located at various sites. These end-users may have different background and/or preferences. For analytics software, these end-users may prefer or require reports to be provided in different languages.

Techniques to provide dynamic multi-lingual support for software applications such as analytics are described herein. The objects for the metadata and presentation layers may be defined using a specific language, similar to that conventionally done, to provide language independent representations. However, each language independent (or native language) representation may be associated with multiple display representations for multiple languages. Using the techniques described herein, the presentation layer may thus be defined in multiple languages (e.g., English, French, German, Japanese, and so on). One of the languages may then be selected for use at any given moment. The loose coupling between the presentation layer and the metadata layer is used to support multiple languages.

In an aspect, during run-time, a language independent representation may be dynamically bound to a specific display representation, which may be selected from among multiple possible display representations based on the specific language selected for use. Using the inventive techniques, the binding may be performed dynamically whenever invoked, and also as often as desired or necessary.

In another aspect, the binding between the metadata and presentation layers is session-specific. As used herein, a session covers the time that an end-user is connected to the application (after authenticating his/her username and password) until such time that the user exits the application, such that the end-user cannot interact with the application without having to reconnect. Thus, the binding may be individually and independently performed for different end-users in different sessions. This feature is especially useful for Web-based and server-based applications that can concurrently support a number of end-users who may have different language preferences. Moreover, this feature is useful to allow different end-users with different language preferences to access and analyze the same underlying data. In addition, the end-users may be allowed to change their languages within the sessions as well. For example, once an end-user login in German, that end-user can thereafter switch to Japanese or some other supported language just as easily. The switching between languages may be achieved, for example, by selecting from a dropdown box similar to the one shown during login, as described below.

The inventive techniques thus support dynamic session-specific binding of UI elements in a synchronized manner across two layers. Using the inventive techniques, an application may be developed/constructed one time with the features noted above. Thereafter, multi-lingual capabilities can be supported by the application based on a single installation and running instance of the application on a server (i.e., a single server instance).

FIG. 4A is a diagram graphically illustrating the mapping of a language independent representation 410 for a UI element to multiple display representations 412a through 412n.

The language independent representation is typically defined based on the language used to develop/construct the application, and is not intended to be changed or translated. The language independent representation may be for an presentation layer object or a metadata layer object. Each language independent representation is associated with a native language name or native language code, and the native language names for metadata objects may be (but are not necessarily) stored in the database along with the associated underlying data.

As shown in FIG. 4A, the language independent representation 410 for the UI element is mapped to multiple display representations 412. Any number of display representations may be defined and supported, depending on the particular design and/or specifications of the software application. Each display representation is associated with a specific language. Thus, the display representations are language dependent representations. Each display representation may be a string of alphanumeric characters and/or some other characters, codes, or representations.

The mapping between the language independent and display representations may be viewed as providing a loose coupling between these two layers. In particular, each language independent representation is not strictly bound to any one display representation (and is thus not bound to any one translation). Rather, each language independent representation may be bound to any one of a number of display representations associated with that language independent representation. Even though there is a one-to-many mapping, only one display representation is bound to the language independent representation at any given moment for a given end-user. The binding may be performed dynamically at the start of a session and may also be changed during the session. Moreover, in an embodiment, the binding is session-specific and only affects that session (but may also be switched while within the session). During the session, the bound display representation is used for the associated UI element when referenced in reports provided to the session end-user. The two distinct layers (i.e., the metadata and presentation layers) can thus be dynamically coupled to provide multi-lingual support for the software application.

FIG. 4B is a diagram illustrating an embodiment of a mapping table 420 that may be used to store the mapping between the language independent representations and display representations. In one specific implementation, mapping table 420 is a logical table that is stored as a binary file in data warehouse 134. Other implementations may also be contemplated, and this is within the scope of the invention.

In the embodiment shown in FIG. 4B, mapping table 420 includes three columns 422, 424, and 426. Column 422 stores the native language names or codes for the language independent representations for the UI elements. These names are language independent (or native language). Column 424 stores indications of different languages. These indications may be stored using intelligible or unintelligible codes, depending on the specific design of the mapping table. Column 426 stores the display representations in different languages for the UI elements. These representations are language dependent and may be in the form of text strings or some other representations that are intelligible to the end-users.

Each row in the mapping table corresponds to a specific mapping of a language independent representation for one UI element to a display representation for a specific language expressed by the language indicator in column 424 for that row. If N different languages are supported by the application, then each UI element may be represented by N entries (or rows) in the mapping table, with each of the N entries corresponding to a different language.

In one embodiment, the mapping table may be developed/constructed along with the software application (e.g., the analytics application) that refers to the table. In another embodiment, the mapping table may be developed/constructed after (and possibly separate from) the development of the application. In either case, the mapping table may be updated as needed, for example, if it is determined that another language needs to be supported, or that some display representations need to be modified, added, and/or deleted.

FIG. 4C is a diagram illustrating a translation table 450 that may be used to store the display representations for a native language and a selected language (i.e., one that is bound for the session). For a given session, a specific language is selected for use. In addition, only a subset of all UI elements may be referenced by that session. For these referenced UI elements, the language independent representations are bound to the display representations associated with the selected language, as graphically shown in FIG. 4A.

Referring back to FIGS. 4A and 4B, if the selected language is German, then the display representations for German for all referenced UI elements are bound to the corresponding language independent representations for these UI elements. As shown in FIG. 4C, the display representations for the native language and the selected language for all referenced UI elements may be stored in translation table 450. Table 450 may be implemented as a logical table and may be stored in memory 128.

Multiple translation tables may be maintained for multiple active sessions. These translation tables may share many common UI elements. In a specific implementation, the translation tables for active sessions are maintained with a single main translation table, which can reduce the amount of duplicate display representations to be stored.

The main translation table may be implemented with three or more columns. The first column stores the display representations for the native language, the second column stores the language indicator (similar to that described above for the mapping table), and the third column stores the display representations for one or more alternative languages. For this implementation, each entry in the main translation table stores the association between a display representation for the native language with a display representation for an alternative language, i.e., the language expressed by the language indicator in that row. If a given UI element is referenced by multiple sessions in multiple languages, then multiple entries may be stored in the main translation table for this UI element for the multiple languages.

In an embodiment, reference counting of shared string resources is employed to reduce memory overhead in the presence of the personalized (session-specific) UI contexts. The main translation table may be used for language translation for all active sessions being supported. With reference counting, this main translation table includes a "reference count" field that indicates the number of active sessions currently referencing each entry in the table. Whenever a new display representation for a UI element is referenced by an active session, that representation is retrieved (e.g., from the Web catalog, if it is a report name or a column name (i.e., metadata)) and stored in the main translation table, and the reference count for this representation is set to one. Thereafter, the reference count is incremented whenever another session references the representation, and decremented whenever a session releases the representation. The representation may be deleted from the main translation table whenever the reference count reaches zero. With reference counting, only one copy of each display representation needs to be stored in the main translation table for all active sessions. This may then substantially reduce memory requirement, especially for a large number of active session.

In an embodiment, string inheritance is employed to provide an application that is more robust in the presence of incomplete translations. The display representations for the UI elements may be stored using a hierarchical object. This object may be defined to have a parent class for a default language representation and one or more sub-level classes for other language representations. The default language is typically the native language but may be some other language. With string inheritance, if the sub-level class is not properly defined (e.g., incomplete), then the parent class is used for the sub-level class. Thus, if the translation for a particular language is not available, then the default (e.g., native) language representations may be used as a substitute for the unavailable representations. String inheritance may be used to embellish the functionality of a multi-lingual application or improve the ease of development of such an application. String inheritance may be used to prevent reports from breaking (i.e., not running successfully) for lack of translation for one or more metadata elements that make up the report. When this occurs, the display representation for the default or base language is used in absence of the translation.

FIG. 5A is a diagram graphically illustrating the mapping between objects in the presentation layer and objects in the metadata layer. As used herein "object" can refer to either a metadata object or a presentation layer object. As noted above, analytical applications typically contains two layers: the metadata layer that explains the underlying data below and the presentation layer that shows reports to the end-users and interacts with the end-users. The metadata may be built by a business modeling person in the native language and deployed in the analytics server. A business analyst (i.e., an end-user) then uses the metadata to build reports. An example of an analytics presentation layer object is a report that shows a company's sales performance over time in the west region of the country in comparison to performance a year back. Reports may include graphs, charts, tables, tickers, and so on that are built on top of the metadata objects.

The reports and similar objects are considered the UI presentation layer. In conventional analytical software tools, the presentation layer for the UI elements is tied to the metadata layer tightly, so that if the metadata in built on one language, the presentation layer (and thus the reports) is also built in the same language. The techniques described herein allows for a loose coupling between these two layers.

Figures 5B, 5C:
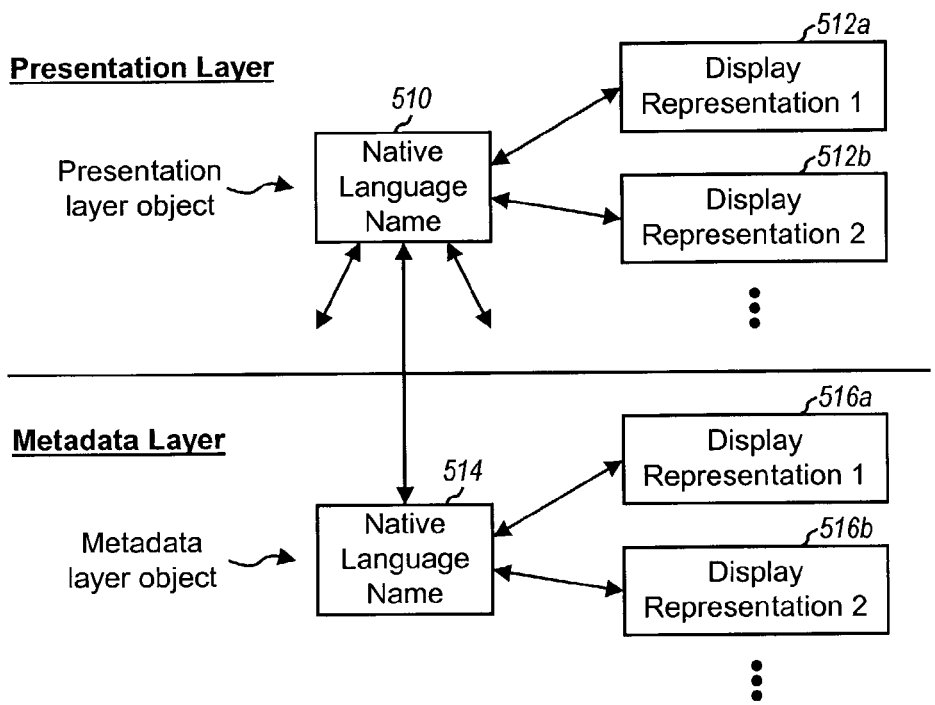

FIG. 5B is a diagram illustrating the coupling between a presentation layer object and a metadata object, and their translations. In a tight coupling structure, the presentation layer objects are tightly bound to the metadata level objects. However, in a loose coupling structure, the native language names (or codes) of the presentation layer objects (e.g., object 510) are tied to the native language names (or codes) of the metadata layer objects (e.g., object 514). The analytics Web client maintains a mapping of (1) native language names of metadata layer objects to language specific display representations or strings 516 and (2) native language names of presentation layer objects to language dependent display representation or strings 512. Thus, the loose coupling allows the report name to be displayed in different languages (e.g., German), without having to rebuild the report in a different language.

FIG. 5C is a diagram illustrating an embodiment of a mapping table 520 within the metadata layer for metadata layer objects. Mapping table 520 provides a mapping of the metadata objects and their display representations, which are also referred to as translated string or translations. Mapping table 520 may be stored in a database, a file, or some other storage mechanism.

Figure 5D:
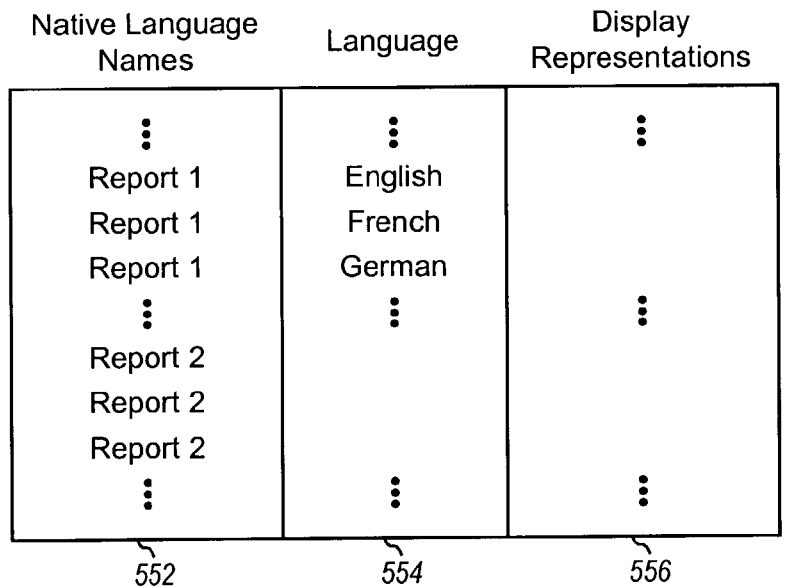

FIG. 5D is a diagram illustrating an embodiment of a mapping table 550 within the presentation layer for presentation layer objects. Mapping table 550 provides a mapping of the presentation layer objects and their display representations or translations. The presentation layer objects may include, for example, report names, page names, folder names, dashboard names, and so on, and are made up of metadata layer objects as shown in FIG. 5A. Mapping table 550 may be stored in a catalog (e.g., Web catalog 124), a file, or some other storage mechanism that can be accessed by the analytics Web client.

Figure 6:
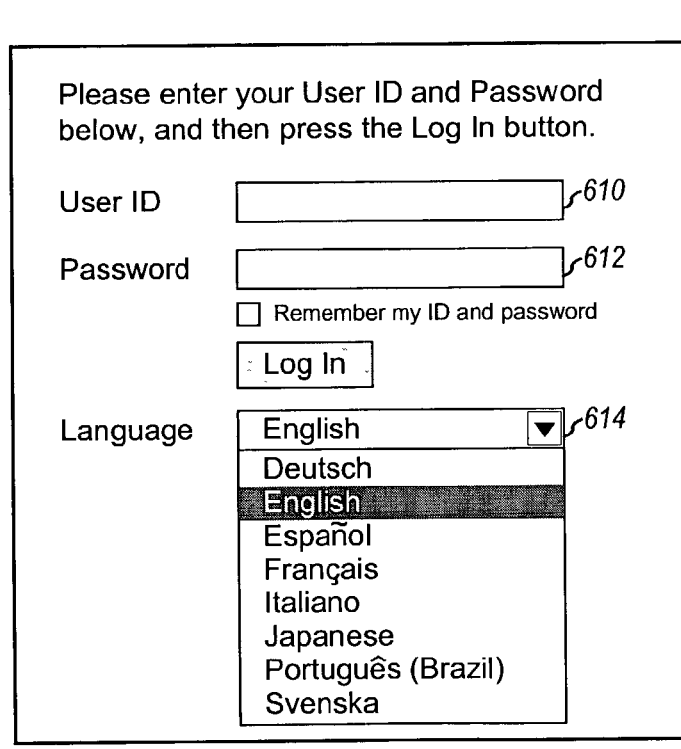
FIG. 6 is a diagram illustrating an embodiment of a logon window that may be used by an end-user to log on to a multi-lingual application.

FIG. 6 is a diagram illustrating an embodiment of a logon window 600 that may be used by an end-user to log on to a multi-lingual application. Referring back to FIG. 1, logon window 600 may be provided to Web browser 110 by Web server 120 in response to a request to access the multi-lingual application. Logon window 600 includes two fields 610 and 612 for the user name and password, respectively. In this embodiment, logon window 600 further includes a drop-box 614 that may be used to select a particular language to use for the session. The drop-box includes a listing of all languages supported by the application. One language may then be selected from this listing, and the selected language is highlighted. A default language may be provided in the drop-box. This default language may be the most commonly used language, the last language selected by the requesting end-user, or some other default choice.

A similar UI control may be provided to allow the end-user to change the language of operation during the session. The language of interaction would then change once the end-user has selected a different language.

In an embodiment, dynamic language detection is employed to determine a specific language to use for each session. The dynamic language detection may include one or more mechanisms that may be employed to determine/detect the end-user's desired language. In one mechanism, the end-user is able to select the desired language at log on, and may further be able to select a new language at any time during the session. The new language may be entered by bringing up the logon window, or via some other button or link provided on the screen.

In another mechanism, the language setting for the end-user's Web browser, client machine, or some other application or hardware is used to select the language to use for the multi-lingual application for the session. For example, if the language setting for the Web browser used to access the Web server is English, then English may be provided as the default language for the logon window. Other information may also be used to select the language for the session. For example, the end-user's location may be used to select a default language for the end-user. The end-user's location may be determined or estimated, for example, based on the network address of the end-user request, a user profile available to the Web server, or by some other means. This mechanism for dynamic language detection improves usability by providing a best-guess language selection where there may be ambiguity.

Once the end-user logs on with the selected (or default) language, the UI elements on the screen are displayed in the new language. However, the underlying data does not change.

Figure 2B:
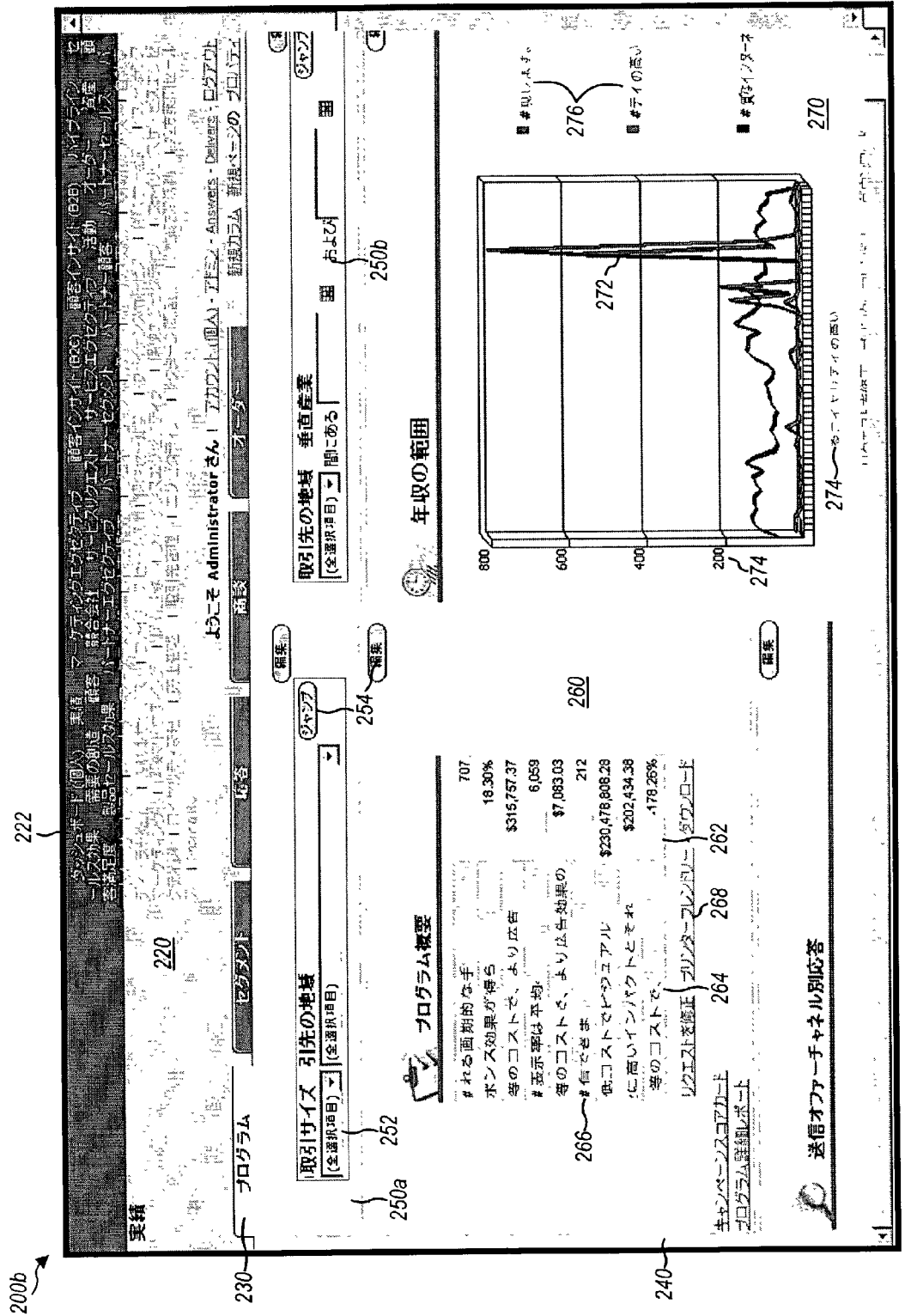

FIG. 2B shows a screen 200*b* for the same report shown in FIG. 2A but in a different language. Screen 200*b* includes menu region 220, set of tabs 230, and display area 240 as shown above for screen 200*a* in FIG. 2A. However, the UI elements in screen 200*b* have all been changed to another selected language selected for the session, which in this example is Japanese.

In display area 240, the underlying data in column 262 within window 260 and the underlying data used to generate plot 272 in window 270 are language independent, and therefore do not change regardless of the selected language. However, the table entry descriptions in column 264, the x and y axes labels 274, the legend labels 276, the text for boxes 250*a*, 250*b*, and 252, and so on, are all language dependent and are changed to the selected language. Since numerical representations may be the same for many languages, the numeric values for the y-axis label are not changed in FIG. 2B when Japanese is selected.

The techniques to provide dynamic multi-lingual support for software applications may be implemented in various manners. For clarity, a specific implementation is described with reference to FIG. 1 for an analytics application. For this implementation, Web server 120 interfaces with the end-users at Web browsers 110, receives requests from the end-users, and forwards analytics-related requests to analytics Web client 122.

Analytics Web client 122 receives and processes the requests from Web server 120. Analytics Web client 122 performs the "front-end" processing to generate reports for the end-users. Analytics Web client 122 has knowledge of the formats and structures of the reports and, depending on the request being processed, may communicate with and query analytics server 130 for the pertinent data and reports.

As part of the front-end processing, analytics Web client 122 performs the translation between the native language and the selected language. To facilitate the translation task, analytics Web client 122 maintains the translation tables for the active sessions and updates these tables as necessary. The translation tables may be built from the mapping table, which may in turn be updated (e.g., by the end-users or administrators) as needed (e.g., to add new translations to the new reports)

Analytics Web client 122 thus performs the "double bookkeeping" for the native language and the selected language. The double bookkeeping comes from the fact that the analytics Web client maintains display representations for both the selected language and the native language. When the analytics Web client communicates with the analytics server, it sends requests in the native language. When the data is returned by the analytics server in the native language, the analytics Web client will then request the translations (i.e., the display representations in the selected language) as well and then uses the translations in the report.

Analytics server 130 performs the "backend" processing for the analytics application. In particular, analytics server 130 processes the requests from analytics Web client 122, provides the requested data back to analytics Web client 122, and further controls access to the metadata.

In an embodiment, analytics server 130 performs the backend processing in the native language and need not be aware of the multi-language capability being supported by the integrated system. Even though the server may be aware that it is running in a multiple language environment, it may not be aware of which specific language is currently being used by the user. Thus, reports are exchanged between analytics server 130 and analytics Web client 122 using the native language. This design simplifies the development/construction of the analytics application, allows for easier upgrade to provide support for additional languages, and simplifies modification of the multi-lingual application (e.g., changes to mapping table).

Data warehouse 134 may be used to store the mapping table that includes, for each UI element, the mapping between the semantic representation and the display representations for all languages. One mapping table may be stored in data warehouse 134. This mapping table may be accessed by analytics Web client 122 via analytics server 130 whenever needed, for example, to build a new translation table at the start of a new session or to update the translation table during an active session when a new language selection is received.

A main reason for storing the mapping table in data warehouse 134 is because analytics server 130 operates on the metadata and is able to access and provide the top layer metadata for the display representations in the native and selected languages for the referenced UI elements. Whenever a request for display representations for a particular language is received, analytics server 130 can simply retrieve and provide the display representations in the selected language, without having to perform any other processing on the mapping table. In an alternative implementation, the mapping table may be stored in Web catalog 124.

A memory accessible to the analytics Web client may be used to store the translation tables for active sessions. Since the binding between UI elements and display representations is session-specific, one translation table may be maintained for each active session. Each translation table includes the display representations for all UI elements referenced by the associated session. However, as described above, to reduce overhead and memory requirements, one main translation table may be maintained for multiple (or all) active sessions using reference counting. The memory may also be used to store the UI elements referenced by analytics Web client 122.

Figure 7:
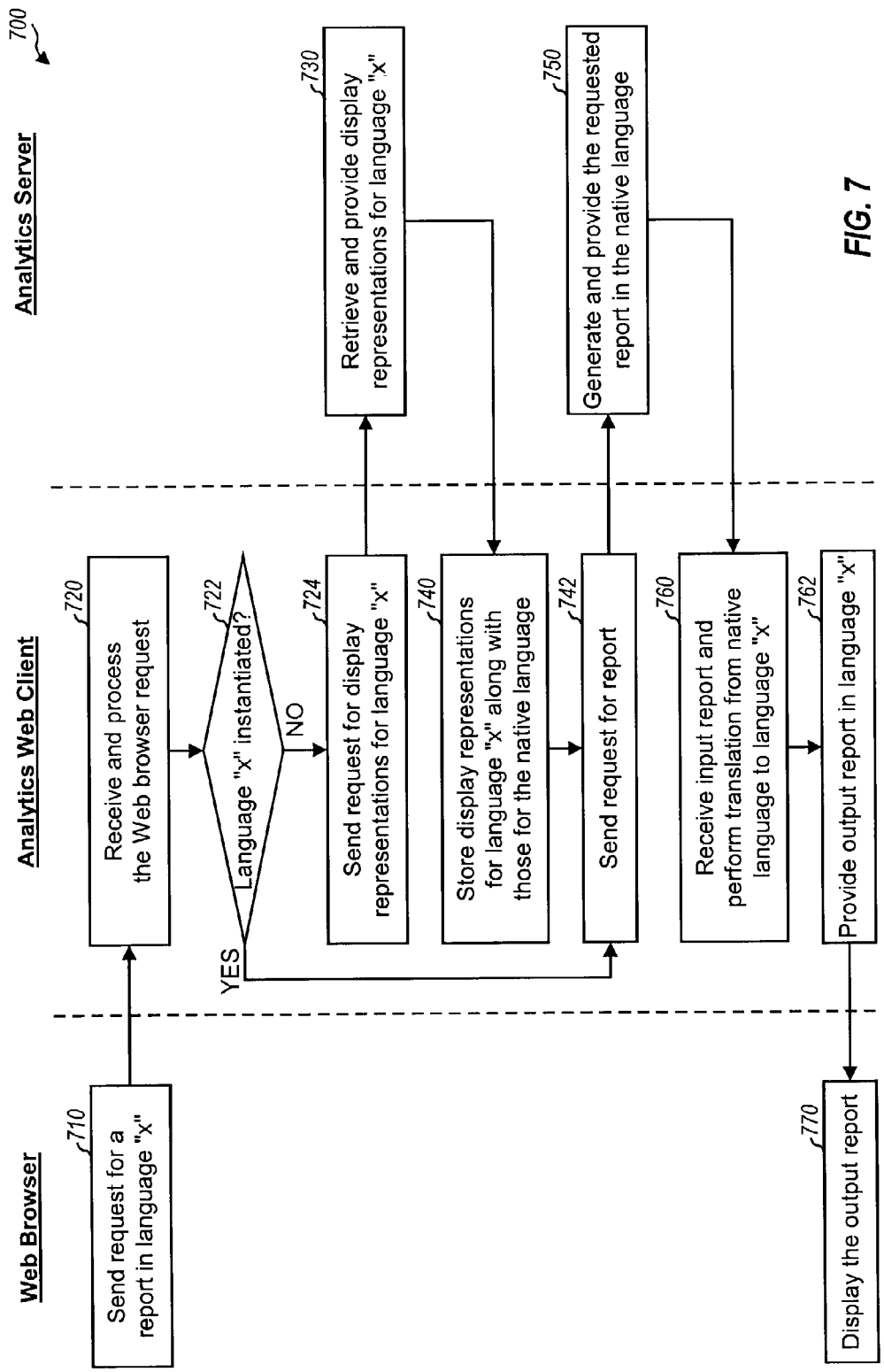
FIG. 7 is a diagram illustrating a specific embodiment of a process for dynamically providing multi-lingual support for an analytics application.

FIG. 7 is a diagram illustrating a specific embodiment of a process 700 for dynamically providing multi-lingual support for an analytics application. For this embodiment, the analytics server operates in the native language for normal operation (e.g., when generating reports). If a particular language (language "x") selected for use for a given session at a Web browser is different from the native language, then the analytics Web client implements the double bookkeeping for the native language and language "x" for the session. The analytics Web client further performs the translation between the native language and language "x".

Initially, an end-user at the Web browser sends a request for a report in a particular selected language (i.e., language "x") to the Web server, which forwards the Web browser request to the analytics Web client for processing (step 710). The analytics Web client receives and processes the Web browser request (step 720). For this request, the analytics Web client first determines whether or not language "x" has already been instantiated for the session with this Web browser (step 722).

In one embodiment, the display representations are stored at the analytics server and provided to the analytics Web client as they are needed. For this embodiment, if the answer for step 722 is yes, then the analytics Web client can proceed directly to step 742 to process the request. Otherwise, the analytics Web client sends a request for display representations for language "x" (step 724). In the above embodiment and as shown in FIG. 7, the mapping table is maintained at the analytics server, in which case the analytics Web client sends this request to the analytics server. In an alternative embodiment, the analytics web client knows what to display for the UI elements, if the mapping table is maintained by the analytics Web client (e.g., in the Web catalog).

The analytics server receives the request for display representations in language "x", retrieves these representations from the mapping table, and provides the requested representations to the analytics Web client (step 730). The analytics Web client receives the language "x" representations from the analytics server and stores them in a translation table for the session with the Web browser (step 740). The language "x" representations are stored in the Web catalog alongside with the native language representations used by the analytics server.

The analytics Web client then sends a request for the report to the analytics server (step 742). The analytics server receives the request and generates the report (step 750). In particular, the analytics server utilizes the metadata needed for the report in order to run the report against the data warehouse, and generates the report using the native language representations. The analytics server then sends the report to the analytics Web client (also in step 750).

The analytics Web client receives the "input" report from the analytics server and performs the translation from the native language to language "x" to provide an "output" report (step 760). In particular, the analytics Web client replaces the native language representations in the input report with their corresponding language "x" representations, which are obtained from the translation table stored in the Web catalog. The analytics Web client then provides the output report in language "x" to the Web browser via the Web server (step 762). The Web browser receives the report from the Web server and displays the report for the end-user (step 770).

As a specific example to provide a clearer understanding of the techniques described herein, an end-user may click on a report that looks to the user as "Anzahl neuer Verkaufsprojekte für Spitzenkampagnen" (in German) The analytics Web client has a mapping table (e.g., table 550 in FIG. 5C) that indicates that this is really "Number of New Opportunities for Top Campaigns" (internal native language name). The analytics Web client then sends a request in the native language to the analytics server. The analytics server obtains the data for the requested report and sends the data back to the analytics Web client. For this example, the report has two axes: "Number of Opportunities" and "Campaign Plan Name". Before showing the graph to the end-user, the analytics Web client again performs a translation from "Number of Opportunities" to "Anz. Verkaufsprojekte" and from "Campaign Plan Name" to "Kampagnenplanname" using the mapping table. In an embodiment, the analytics Web client obtains these translations from the analytics server (instead of the Web catalog). The analytics Web client then stores these translations in memory for future use so that it does not need to request them from the analytics server again.

Table 1 shows the above example transaction, as observed by the end-users, the analytics Web client, and the analytics server.

TABLE 1

| | |
|---|---|
| End-user interacts with report: | "Anzahl neuer Verkaufsprojekte für Spitzenkampagnen" (German) |
| Analytics Web catalog stores report as: | "Number of New Opportunities for Top Campaigns" |
| Analytics Web sends request to analytic server as: | "Give me the Number of New Opportunities By Campaign Plan Name" |
| Analytic server returns data as: | Number of Opportunities, Campaign Plan Name |
| Analytics Web client displays the data as: | Anz. Verkaufsprojekte, Kampagnenplanname |

The process shown in FIG. 7 is used to provide a clear understanding of certain inventive aspects described herein. Numerous modifications may be made to this process depending on the specific implementation of the analytics server and analytics Web client. For example, the process may be modified depending on (1) where the mapping table is stored (e.g., at the analytics Web client or analytics server), (2) where the translation table is stored, (3) the language capability of the analytics server, and so on. For example, a single integrated software application installed and executed on a single server may be designed and used (instead of the two applications installed/executed on two servers shown in FIG. 1). These various designs are within the scope of the invention.

Several features are thus used herein to dynamically provide multi-lingual support for applications. First, two levels of resource externalization is supported by the inventive techniques, whereby the second level is session-specific. Conventional applications normally support one level of resource externalization, which is defined by the mapping of each semantic representation to a specific display representation. With the inventive techniques, the second level of resource externalization is provided via the session-specific run-time binding of strings to application-metadata at logon time and as demanded. This feature allows for personalized skins/styles of the application for the end-users.

Second, double bookkeeping is used to support a "develop once/deploy against many languages" scheme in the presentation layer. This double bookkeeping relates to the maintenance of a translation table for each active session with the strings for the selected language. The application and the mapping table may be developed once. Thereafter, for a given installation/execution of the application (i.e., for a single server instance), multiple languages may be (concurrently) supported by different bindings of the semantic and display representations (i.e., different presentation layer instantiations).

The techniques described herein may be used to provide multi-lingual capability and other advantages. For example, these techniques allow one server to support multiple clients operating in different languages. In particular, a Web-based analytics application may be installed and executed on a server at one location and accessed by multiple end-users at various locations via Web browsers. Using the inventive techniques, this single server instance would then be able to provide multi-lingual support for these different clients.

These techniques also allow for the development of an application in a language independent manner. That means that the application may be build/constructed once and then thereafter deployed globally.

Figure 8:
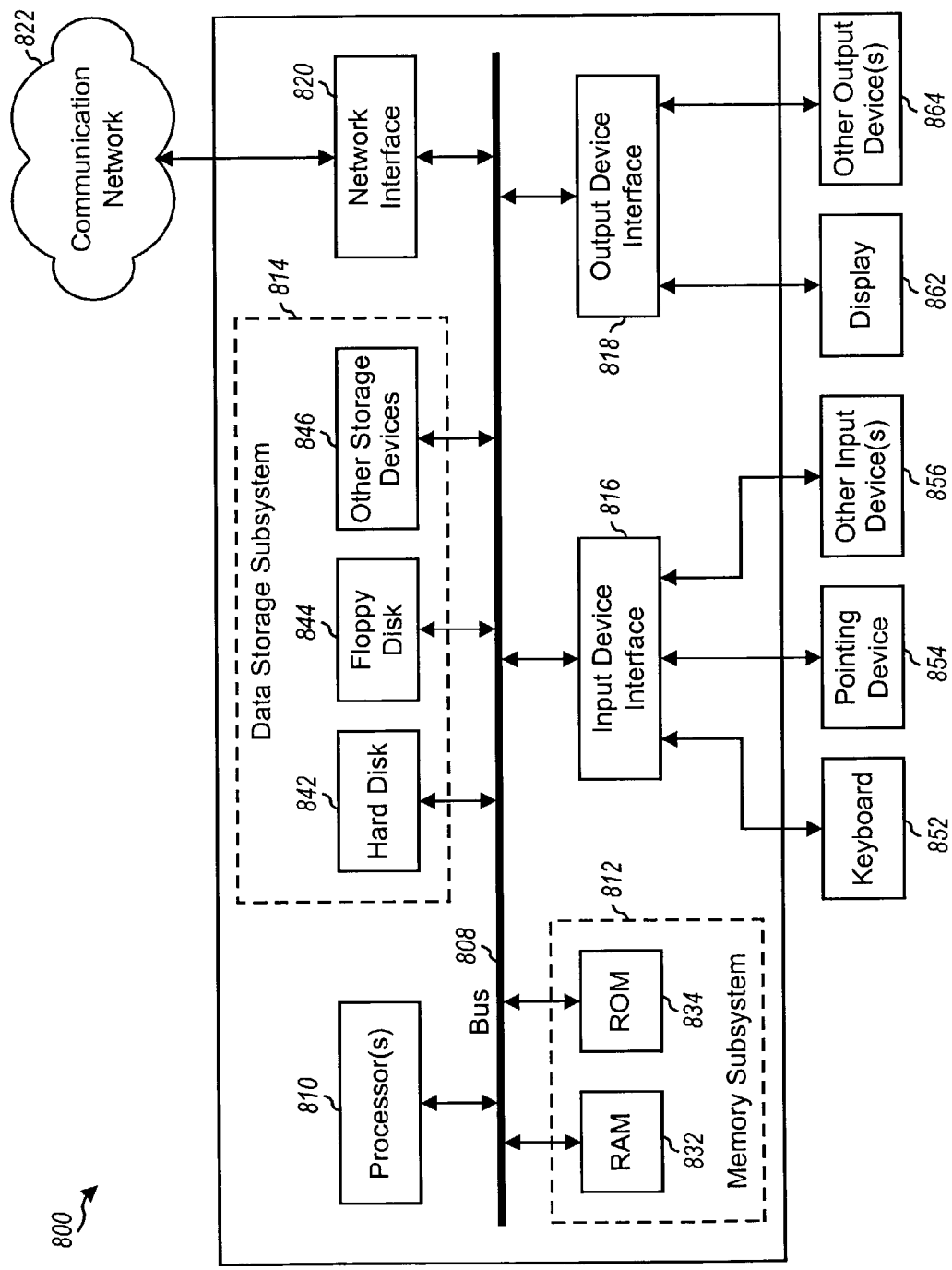
FIG. 8 is a block diagram of a computer system.

FIG. 8 is a block diagram of an embodiment of a computer system 800 that may be used to implement Web server 120 and analytics server 130 in FIG. 1. System 800 includes a bus 808 that interconnects major subsystems such as one or more processors 810, a memory subsystem 812, a data storage subsystem 814, an input device interface 816, an output device interface 818, and a network interface 820. Processor(s) 810 perform many of the processing functions for system 800 and communicate with a number of peripheral devices via bus 808.

Memory subsystem 812 may include a RAM 832 and a ROM 834 used to store codes and data that implement various aspects of the invention. For example, memory subsystem 812 may be used for memory 128 in FIG. 1. In a distributed environment, the program codes and data may be stored on a number of computer systems and used by the processors of these systems. Data storage subsystem 814 provides non-volatile storage for program codes and data, and may include a hard disk drive 842, a floppy disk drive 844, and other storage devices 846 such as a CD-ROM drive, an optical drive, and removable media drive. For example, data storage subsystem 814 may be used for database warehouse 134 and/or metadata store 136 in FIG. 1.

Input device interface 816 provides interface with various input devices such as a keyboard 852, a pointing device 854 (e.g., a mouse, a trackball, a touch pad, a graphics tablet, a scanner, or a touch screen), and other input device(s) 856. Output device interface 818 provides an interface with various output devices such as a display 862 (e.g., a CRT or an LCD) and other output device(s) 864. Network interface 820 provides an interface for system 800 to communicate with other computers coupled to communication network 822.

Many other devices or subsystems (not shown) may also be coupled to system 800. In addition, it is not necessary for all of the devices shown in FIG. 8 to be present to practice the invention. Furthermore, the devices and subsystems may be interconnected in configurations different from that shown in FIG. 8. One or more of the storage devices may be located at remote locations and coupled to system 800 via communication network 822. The operation of a computer system such as that shown in FIG. 8 is readily known in the art and not described in detail herein. The source codes to implement certain embodiments of the invention may be operatively disposed in memory subsystem 812 or stored on storage media such as a hard disk, a floppy disk, or a CD-ROM that is operative with a CD-ROM player.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A computer program product operative to provide multi-lingual support, comprising a computer-usable storage medium having embodied therein computer-readable program codes executable by a computer system for identifying a first set of objects in response to the computer system receiving an indication of a first language to be used for a first session, wherein each object in the first set is associated with a language independent representation, determining whether a store comprising language dependent representations of at least some of the objects of the first set for each of a plurality of languages includes language dependent representations corresponding to the first language for at least some of the objects of the first set;

from the store, retrieving first language dependent representations of the first set of objects for the first language in response to determining that the store includes language dependent representations corresponding to the first language for at least some of the objects of the first set, wherein the retrieving comprises accessing a mapping table, and the mapping table comprises language dependent representations;

building a translation table in response to the retrieving, wherein the translation table comprises a set of language dependent representations, the set of language dependent representations comprises the retrieved first language dependent representations, the set language dependent representations comprises all language dependent representations contained in the translation table, and the set of language dependent representations is a subset of the language dependent representations contained in the mapping table; and without modifying the first set of objects, rendering output reports provided for the first session, wherein the rendering comprises using some or all of the retrieved first language dependent representations by accessing the translation table.

2. The computer program product of claim 1, wherein the computer-usable medium is further embodied with computer-readable program codes for receiving an indication of a second language to be used for a second session;

obtaining a set of second language dependent representations associated with the second language for a second set of objects; and using the second language dependent representations for objects included in output reports provided for the second session.

3. The computer program product of claim 1, wherein the computer-usable medium is further embodied with computer-readable program codes for using the language independent representations to generate input reports from which the output reports are derived.

4. The computer program product of claim 3, wherein the computer-usable storage medium is further embodied with computer-readable program codes for maintaining a table for the set of first language dependent representations and the associated set of language independent representations.

5. The computer program product of claim 1, wherein the computer-usable storage medium is further embodied with computer-readable program codes for maintaining a table for language dependent representations used for translating input reports in a native language to output reports in one or more alternative languages, wherein the first language is one of the one or more alternative languages.

6. The computer program product of claim 5, wherein one table is maintained for each session.

7. The computer program product of claim 5, wherein one table is maintained for a plurality of sessions.

8. The computer program product of claim 7, wherein the table further stores, for each language dependent representation for an alternative language, a count indicative of the number of sessions referencing that language dependent representation.

9. The computer program product of claim 1, wherein the computer-usable storage medium is further embodied with computer-readable program codes for binding the language independent representation for each object to the corresponding first language dependent representation for the object.

10. The computer program product of claim 9 wherein the binding between the set of first language dependent representations and the set of language independent representations is specific to the first session.

11. The computer program product of claim 1, wherein the set of first language dependent representations is obtained at the start of the first session.

12. The computer program product of claim 1, wherein the set of first language dependent representations is obtained in response to a new language selection during the first session.

13. The computer program product of claim 1, wherein the computer-usable storage medium is further embodied with computer-readable program codes for using a default language dependent representation for each object included in an output report if the first language dependent representation for the object is not available.

14. The computer program product of claim 1, wherein the language indication is provided via user input.

15. The computer program product of claim 1 wherein the computer program product is operative in conjunction with a software application to provide the output reports;

the software application is an analytics application; and multi-lingual capability is supported based on a single running instance of the computer program product and the software application.

16. A computer program product operative to provide multi-lingual support, comprising a computer-usable medium having embodied therein computer-readable program codes executable by a computer system for selecting a first set of objects from a plurality of objects in response to the computer system receiving a first request, wherein each object in the first set is associated with a language independent representation;

from a store comprising first and second language dependent representations for at least some of the of objects of the plurality of objects, retrieving the first language dependent representation for at least some of the object of the first set, wherein the retrieving comprises accessing a mapping table, and the mapping table comprises language dependent representations;

building a translation table in response to the retrieving, wherein the translation table comprises a set of language dependent representations, the set of language dependent representations comprises the retrieved first language dependent representations, the set of language dependent representations comprises all language dependent representations contained in the translation table, and the set of language dependent representations is a subset of the language dependent representations contained in the mapping table;

rendering a first output report, wherein the rendering comprises using some or all of the retrieved first language dependent representations by accessing the translation table;

selecting a second set of object from the plurality of objects in response to the computer system receiving a second request;

from the store comprising the first and second language dependent representations for at least some of the objects of the plurality of projects, retrieving the second language dependent representation for at least some of the objects of the second set;

rendering a second output report using the retrieved second language dependent representations.

17. A computer program product operative to provide multi-lingual support, comprising a computer-usable medium having embodied therein computer-readable program codes executable by a computer system for
  selecting a first set of objects from a plurality of objects in response to the computer system receiving a first request, wherein
    each object in the first set is associated with a language independent representation;
  from a store comprising first and second language dependent representations for at least some of the objects of the plurality of objects, retrieving the first language dependent representation for at least some of the object of the first set, wherein
    the retrieving comprises accessing a mapping table, and
    the mapping table comprises language dependent representations;
  building a translation table in response to the retrieving, wherein
    the translation table comprises a set of language dependent representations,
    the set of language dependent representations comprise the retrieved first language dependent representations,
    the set of language dependent representations comprises all language dependent representations contained in the translation table, and
    the set of language dependent representations is a subset of the language dependent representations contained in the mapping table;
  rendering a first output report, wherein
    the rendering comprises using some or all of the retrieved first language dependent representations by accessing the translation table;
  from the store comprising first and second language dependent representations for at least some of the objects of the plurality of objects, retrieving the second language dependent representation for at least some of the objects of the first set;
  rendering a second output report using the retrieved second language dependent representations.

18. A computer program product operative to provide multi-lingual support, comprising a computer-usable medium having embodied therein computer-readable program codes executable by a computer system for
  identifying a first set of objects in response to the computer system receiving an indication of a first language to be used for a fist session, wherein
    each object in the first set is associated with a language independent representation;
  determining whether a store comprising language dependent representations of at least some of the objects of the first set for each of a plurality of language includes language dependent representations corresponding to the first language for at least some of the objects of the first set;
  from the store, retrieving first language dependent representations of the first set of objects for the first language in response to determining that the store includes language dependent representations corresponding to the first language for at least some of the objects of the first set;
  building a translation table in response to the retrieving, wherein
    the translation table comprises at least some of the retrieved first language dependent representations; and
  rendering a plurality of output reports provided for the session, wherein
    the rendering of each output report comprises using some or all of the retrieved first language dependent representations by assessing the translation table.

19. A computer program product operative to provide multi-lingual support, comprising a computer-usable medium having embodied therein computer-readable program codes executable by a computer system for
  identifying a first set of user interface objects in response to the computer system
    receiving an indication of a first language to be used for a first session, wherein
    the user interface objects are elements on a screen that may be associated with a visual, language dependent representation;
  determining whether a store comprising language dependent representations of at least some of the user interface objects of the first set for each of a plurality of languages includes language dependent representations corresponding to the first language for at least some of the user interface objects of the first set;
  from the store, retrieving first language dependent representations of the first set of user interface objects for the first language in response to determining that the store includes language dependent representations corresponding to the first language for at least some of the user interface objects of the first set;
  building a translation table in response to the retrieving, wherein
    the translation table comprises at least some of the retrieved first language dependent representations; and
  rendering a plurality of output reports provided for the first session, wherein
    the rendering of each output report comprises using some or all of the retrieved first language dependent representations by accessing the translation table.

* * * * *

UNITED STATES PATENT AND TRADEMARK OFFICE
CERTIFICATE OF CORRECTION

PATENT NO.      : 7,634,397 B2                                    Page 1 of 2
APPLICATION NO. : 10/186345
DATED           : December 15, 2009
INVENTOR(S)     : Edward Shaw-Lee Suen et al.

It is certified that error appears in the above-identified patent and that said Letters Patent is hereby corrected as shown below:

On the Title page, item (*) Notice:   should read as follows:   Subject to any disclaimer, the term of this patent is extended or adjusted under 35 U.S.C. 154(b) by 834 days.

On the Title page, item (56), in column 2, under "U.S. Patent Documents", line 7, delete "715/536" and insert -- 715/264 --, therefor.

In column 12, line 40, delete "reports)" and insert -- reports). --, therefor.

In column 16, line 49-50, in claim 1, delete "representation," and insert -- representation; --, therefor.

In column 17, line 6, in claim 1, delete "set" and insert -- set of --, therefor.

In column 17, line 18, in claim 2, delete "medium" and insert -- storage medium --, therefor.

In column 17, line 30, in claim 3, delete "medium" and insert -- storage medium --, therefor.

In column 18, line 24, in claim 16, delete "medium" and insert -- storage medium --, therefor.

In column 18, line 32, in claim 16, delete "the of objects" and insert -- the objects --, therefor.

In column 18, line 34, in claim 16, delete "object" and insert -- objects --, therefor.

In column 18, line 56, in claim 16, delete "object" and insert -- objects --, therefor.

In column 18, line 61, in claim 16, delete "projects," and insert -- objects, --, therefor.

In column 19, line 1, in claim 17, delete "medium" and insert -- storage medium --, therefor.

In column 19, line 11, in claim 17, delete "object" and insert -- objects --, therefor.

Signed and Sealed this

Fourteenth Day of September, 2010

David J. Kappos
*Director of the United States Patent and Trademark Office*

CERTIFICATE OF CORRECTION (continued)
U.S. Pat. No. 7,634,397 B2

In column 19, line 21, in claim 17, delete "comprise" and insert -- comprises --, therefor.

In column 19, line 44, in claim 18, delete "medium" and insert -- storage medium --, therefor.

In column 19, line 48, in claim 18, delete "fist" and insert -- first --, therefor.

In column 19, line 53, in claim 18, delete "language" and insert -- languages --, therefor.

In column 20, line 15, in claim 18, delete "the" and insert -- the first --, therefor.

In column 20, line 19, in claim 18, delete "assessing" and insert -- accessing --, therefor.

In column 20, line 22, in claim 19, delete "medium" and insert -- storage medium --, therefor.